United States Patent
Ha et al.

(10) Patent No.: US 10,049,662 B2
(45) Date of Patent: Aug. 14, 2018

(54) METHOD AND ELECTRONIC DEVICE FOR PROVIDING CONTENT

(71) Applicant: Samsung Electronics Co., Ltd., Suwon-si, Gyeonggi-do (KR)

(72) Inventors: Hye Min Ha, Suwon-si (KR); Kyung Jun Lee, Suwon-si (KR); Bong Won Lee, Seoul (KR); Hyun Yeul Lee, Seoul (KR); Pragam Rathore, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/082,499

(22) Filed: Mar. 28, 2016

(65) Prior Publication Data
US 2016/0284351 A1    Sep. 29, 2016

(30) Foreign Application Priority Data
Mar. 26, 2015    (KR) .......................... 10-2015-0042740

(51) Int. Cl.
*G10L 21/00*    (2013.01)
*G10L 15/22*    (2006.01)
(Continued)

(52) U.S. Cl.
CPC .............. *G10L 15/22* (2013.01); *G06F 3/013* (2013.01); *G06F 3/04817* (2013.01); *G06F 3/16* (2013.01);
(Continued)

(58) Field of Classification Search
CPC ... G10L 15/22; G10L 2015/223; G10L 13/00; G10L 15/20; G10L 15/26; G10L 15/28; G10L 15/30; G10L 17/02; G10L 2015/227; G10L 21/00; G10L 21/0208; G10L 2015/228; G10L 2021/0135; G10L 2021/02082; G10L 2021/02166
(Continued)

(56) References Cited

U.S. PATENT DOCUMENTS 6,788,768 B1 *  9/2004  Saylor .................... G06Q 10/10
                                              379/265.02
6,791,904 B1 *  9/2004  Herron ................ H04L 12/2803
                                              368/13
(Continued)

FOREIGN PATENT DOCUMENTS

CN    103021409 A    4/2013
CN    103309618 A    9/2013
(Continued)

*Primary Examiner* — Vijay B Chawan
(74) *Attorney, Agent, or Firm* — Jefferson IP Law, LLP

(57) ABSTRACT

A method and an electronic device for providing content are provided. The electronic device includes a voice input module configured to receive a voice input, an audio output module, a display, a memory configured to store a voice recognition application which provides content in response to the voice input, and a processor configured to execute the voice recognition application and determine an output scheme of the content to be outputted through the audio output module or the display based on a status of the voice recognition application or an operating environment of the electronic device.

20 Claims, 11 Drawing Sheets

(51) Int. Cl.
*G06F 3/16* (2006.01)
*G06F 3/01* (2006.01)
*G06F 3/0481* (2013.01)
*G10L 17/06* (2013.01)
*H04N 5/225* (2006.01)

(52) U.S. Cl.
CPC .............. *G06F 3/167* (2013.01); *G10L 17/06* (2013.01); *H04N 5/225* (2013.01)

(58) Field of Classification Search
USPC .... 704/275, 243, 246, 270.1, 270, 233, 231, 704/258; 379/88.01, 88.13, 88.17; 455/566, 550.1; 715/727
See application file for complete search history.

(56) References Cited

U.S. PATENT DOCUMENTS

| | | | | |
|---|---|---|---|---|
| 7,096,185 | B2* | 8/2006 | Reichardt | G11B 27/105 348/E5.105 |
| 7,275,032 | B2* | 9/2007 | Macleod | G10L 13/00 379/88.01 |
| 7,318,198 | B2* | 1/2008 | Sakayori | G09B 21/00 704/E15.045 |
| 7,334,050 | B2* | 2/2008 | Zondervan | G06F 17/30905 704/270.1 |
| 8,237,552 | B2 | 8/2012 | Kim et al. | |
| 9,502,035 | B2 | 11/2016 | Luo et al. | |
| 2006/0197860 | A1 | 9/2006 | Kim et al. | |
| 2012/0326976 | A1* | 12/2012 | Markovic | G06F 3/017 345/156 |
| 2014/0304606 | A1* | 10/2014 | Ohmura | G06F 3/167 715/728 |
| 2015/0033130 | A1 | 1/2015 | Scheessele | |
| 2015/0040012 | A1* | 2/2015 | Faaborg | G10L 15/22 715/728 |
| 2015/0379992 | A1* | 12/2015 | Lee | G10L 15/22 704/275 |
| 2016/0098991 | A1 | 4/2016 | Luo et al. | |
| 2017/0109011 | A1 | 4/2017 | Jiang | |

FOREIGN PATENT DOCUMENTS

| | | |
|---|---|---|
| CN | 103488384 A | 1/2014 |
| CN | 103491406 A | 1/2014 |
| KR | 10-2006-0096869 A | 9/2006 |
| WO | 2013/162603 A1 | 10/2013 |
| WO | 2014177015 A1 | 11/2014 |

* cited by examiner

METHOD AND ELECTRONIC DEVICE FOR PROVIDING CONTENT

CROSS-REFERENCE TO RELATED APPLICATION(S)

This application claims the benefit under 35 U.S.C. § 119(a) of a Korean patent application filed on Mar. 26, 2015 in the Korean Intellectual Property Office and assigned Serial number 10-2015-0042740, the entire disclosure of which is hereby incorporated by reference.

TECHNICAL FIELD

The present disclosure relates to a method and an electronic device for providing content in response to a voice input.

BACKGROUND

Currently, a user input interface applied to electronic devices is implemented to support a user input based on a voice input as well as a user input (e.g., an input through a button type key pad, a keyboard, a mouse, a touch panel, and the like) based on the physical manipulation by a user.

An electronic device that has a voice interface, such as an interface based on a user's voice, receives the user's voice to convert the received user's voice into an electrical signal and performs a function set in advance by processing the electrical signal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a content providing method which is capable of outputting content corresponding to a voice input in the most suitable way based on an operating environment of the electronic device or a status of a voice recognition application and an electronic device performing the same.

In accordance with an aspect of the present disclosure, the electronic device is provided. The electronic device includes a voice input module configured to receive a voice input, an audio output module, a video output module, a memory configured to store a voice recognition application which provides content in response to the voice input, and a processor configured to execute the voice recognition application, and determine an output scheme of the content to be outputted through the audio output module or the video output module based on a status of the voice recognition application or an operating environment of the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
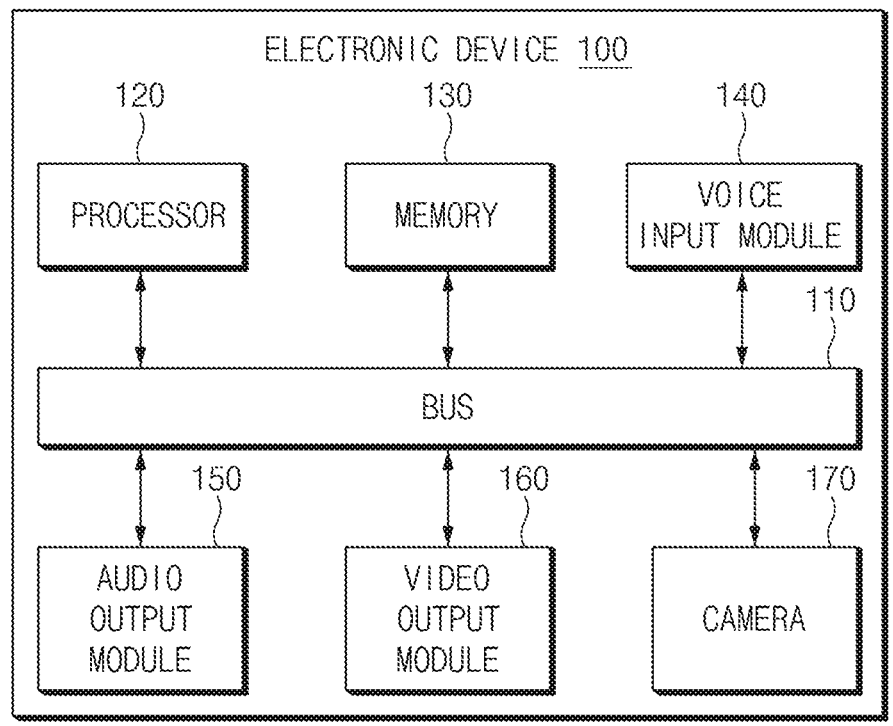
FIG. 1 is a block diagram illustrating a configuration of an electronic device according to an embodiment of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments of the present disclosure, a wearable device may include at least one of an accessory type (e.g., watch, ring, bracelet, ankle bracelet, necklace, glasses, contact lens, or head-mounted-device (HMD)), a fabric or clothing type (e.g., electronic apparel), a physical attachment type (e.g., skin pad or tattoo), or a body implantation type (e.g., implantable circuit).

According to various embodiments, the electronic device may be one of the above-described devices or a combination thereof. An electronic device according to an embodiment may be a flexible electronic device. Furthermore, an electronic device according to an embodiment may not be limited to the above-described electronic devices and may include other electronic devices and new electronic devices according to the development of technologies.

Hereinafter, electronic devices according to an embodiment of the present disclosure will be described with reference to the accompanying drawings. The term "user" used herein may refer to a person who uses an electronic device or may refer to a device (e.g., an artificial intelligence electronic device) that uses an electronic device.

FIG. 1 is a block diagram illustrating a configuration of an electronic device according to an embodiment of the present disclosure.

Referring to FIG. 1, an electronic device 100 according to an embodiment of the present disclosure may include a bus 110, a processor 120, a memory 130, a voice input module 140, an audio output module 150, a video output module 160, and a camera 170. The electronic device 100 may not include at least one of the above-described components or may further include other component(s).

The bus 110 may interconnect the above-described components 120 to 170 and may be a circuit for conveying communications (e.g., a control message and/or data) among the above-described components.

The processor 120 may include one or more of a central processing unit (CPU), an application processor (AP), or a communication processor (CP). The processor 120 may perform, for example, data processing or an operation associated with control and/or communication of at least one other component(s) of the electronic device 100.

The processor 120 may execute a voice recognition application (e.g., S-Voice) stored in the memory 130 and may convert a voice input to a control command or a content request based on the voice recognition application. If the voice input is converted to the control command, the processor 120 may control various modules included in the electronic device 100 based on the control command. For example, in the case where a voice input is "Turn on Bluetooth.", the processor 120 may activate a Bluetooth module embedded in the electronic device 100.

Furthermore, if the voice input is converted to a content request, the processor 120 may output corresponding content based on the content request. For example, if a voice input, such as "Let me know today's weather.", is converted to a request about weather content, the processor 120 may provide the weather content to a user.

According to an embodiment of the present disclosure, the processor 120 may determine an output scheme of content to be outputted through the audio output module 150 or the video output module 160 based on a status of the voice recognition application or an operating environment of the electronic device 100. The processor 120 may output content corresponding to the voice input through the audio output module 150 or the video output module 160 based on the determined output scheme.

For example, in the case where the voice recognition application is running in a foreground of the electronic device 100, the processor 120 may determine to control the video output module 160 to output detailed information of content corresponding to a voice input. Furthermore, in the case where the voice recognition application is running in a background of the electronic device, the processor 120 may determine to control the video output module 160 to output an icon associated with the content.

In this specification, that an application is running in the foreground should be understood as an execution screen of the application is displayed on the whole area or the almost whole area of the video output module 160 of the electronic device 100. Furthermore, a state in which an application is running in the background should be understood as the application is running in a non-foreground state.

For example, if the voice recognition application is running in the foreground, a screen of the voice recognition application (e.g., a screen displayed according to S-Voice, refer to FIG. 4B) may be displayed on the video output module 160. At this time, if a voice input is received from a user, the processor 120 may display corresponding content on a screen of the voice recognition application in response to the voice input.

Figure 4A:
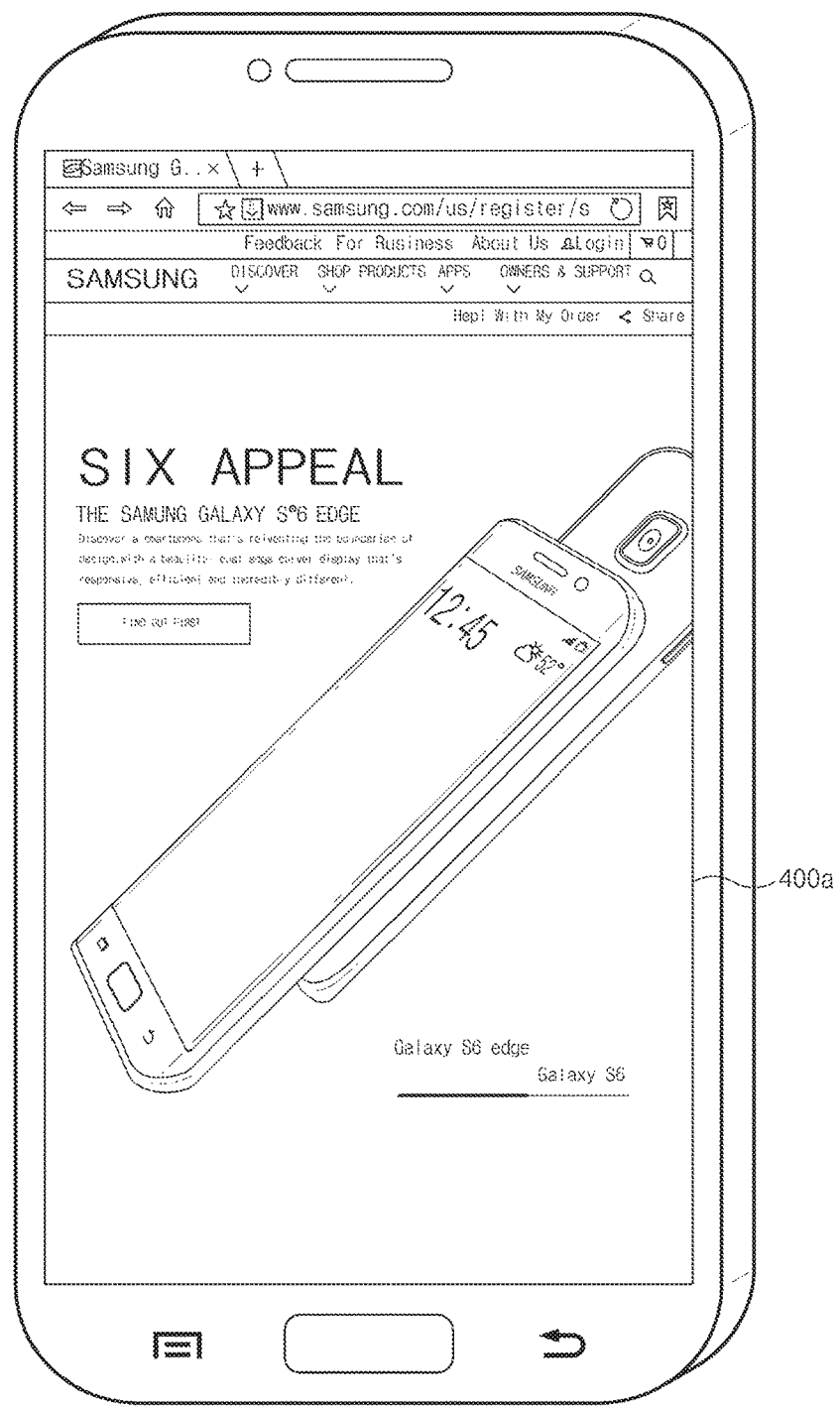
FIG. 4A is a diagram illustrating an electronic device in which a voice recognition application is running in a background according to an embodiment of the present disclosure.

However, if the voice recognition application is running in the background, a screen (e.g., a screen displayed according to a web browsing application, refer to FIG. 4A) of an application which is different from the voice recognition application may be displayed on the video output module 160. At this time, if a voice input is received from a user, the processor 120 may additionally display an icon (e.g., a first icon 501 of FIG. 5A) associated with the content on the screen of another application in response to the voice input. At this time, if the user selects the icon (e.g., touch), the processor 120 may output detailed information of the content associated with the icon through the video output module 160 in response to the selection of the icon.

Furthermore, if a voice input is received from a user while the voice recognition application is running in the background, the processor 120 may display the icon and may simultaneously change a shape of the icon based on the content.

For example, the icon associated with the content may be dynamically implemented in the form of an animation. Furthermore, content corresponding to a voice input may be provided to a user through the audio output module 150 based on text to speech (hereinafter referred to as "TTS"). In this case, the processor 120 may perform synchronization between an output of content by the audio output module 150 and a shape change of an icon displayed on the video output module 160.

Furthermore, the processor 120 according to an embodiment of the present disclosure may analyze a voice input received from the voice input module 140 and may detect a noise included in the voice input and/or the number of users corresponding to the voice input based on the analyzed result. The processor 120 may determine an output scheme of content to be outputted through the audio output module 150 based on the detection result.

For example, if a noise which satisfies a specified condition is detected in a voice input, the processor 120 may determine to control the audio output module 150 to output abstract information of content corresponding to the voice input. Furthermore, if the noise which satisfies the specified condition is not detected in the voice input, the processor 120 may determine to control the audio output module 150 to output detailed information of content.

The noise which satisfies the specified condition may be detected based on an analysis of frequency, wave shape, or amplitude. For example, the noise which satisfies the specified condition may include a residential noise at an outdoor space. Furthermore, a usual white noise may not be considered in determining whether the noise which satisfies the specified condition is included in the voice input. Accordingly, the processor 120 may determine whether the user is in an outdoor public space or in a private space.

Furthermore, according to an embodiment, if a plurality of users corresponding to a voice input is detected in the voice input, the processor 120 may determine to control the audio output module 150 to output abstract information of content. If a user corresponding to the voice input is detected in the voice input, the processor 120 may determine to control the audio output module 150 to output detailed information of content.

The detection of the number of users corresponding to a voice input may be performed, for example, through a frequency analysis about the voice input. The processor 120 may determine whether only a user who uses the electronic device 100 exists in the vicinity of the electronic device 100 or whether the user exists with another user in the vicinity of the electronic device 100, through the frequency analysis.

According to an embodiment of the present disclosure, the processor 120 may determine an output scheme of the video output module 160 based on an output scheme of the audio output module 150. For example, if a noise which satisfies a specified condition is detected in a voice input or if a plurality of users corresponding to the voice input is detected in the voice input, the processor 120 may output abstract information of content through the audio output module 150 and may simultaneously output detailed information of the content through the video output module 160.

The processor 120 according to an embodiment of the present disclosure may determine an output scheme of the content to be outputted through the audio output module 150 based on a result of determining a gaze at the camera 170.

For example, if it is determined that a user's gaze is toward the video output module 160, the processor 120 may determine to control the audio output module 150 to output abstract information of content. If it is determined that the user's gaze is not toward the video output module 160, the processor 120 may determine to control the audio output module 150 to output detailed information of content.

The processor 120 may determine an output scheme of the video output module 160 based on an output scheme of the audio output module 150. For example, if it is determined that a user's gaze is toward the video output module 160, the processor 120 may output abstract information of content through the audio output module 150 and may simultaneously output detailed information of the content through the video output module 160.

Furthermore, the processor 120 according to an embodiment of the present disclosure may determine an output scheme of the content to be outputted through the audio output module 150 or the video output module 160 based on a video of the vicinity of the electronic device 100 shot by the camera 170.

For example, the processor 120 may determine the output scheme of the content based on the number of users included in the shot video. When determining the number of users, the processor 120 may apply a face recognition algorithm to the shot video and may determine the number of users included in the shot video or may recognize a specific user.

For example, if it is determined that a user is included in the shot video, the processor 120 may determine to control the audio output module 150 and/or the video output module 160 to output detailed information of content. In contrast, if it is determined that a plurality of users is included in the shot video, the processor 120 may determine to control the audio output module 150 and/or the video output module 160 to output abstract information of content or not to output information of content.

Furthermore, as another example, if it is determined that an authenticated user of the electronic device 100 is included in the shot video, the processor 120 may determine to control the audio output module 150 and/or the video output module 160 to output detailed information of content. In contrast, if it is determined that an unauthenticated user is included in the shot video, the processor 120 may determine to control the audio output module 150 and/or the video output module 160 to output abstract information of content or not to output information of content.

Abstract information of content may be information of a portion of content or summarized information of the content or may correspond to a portion of the content. In some embodiments, the abstract information of content may be understood as including an icon associated with the content. Furthermore, detailed information of content may be all information about the content.

The abstract information and the detailed information of the content may be acoustically provided to a user through the audio output module 150 based on a voice output function, such as TTS. Furthermore, abstract information and detailed information of the content may be visually provided to the user through the video output module 160.

The memory 130 may include a volatile and/or a non-volatile memory. For example, the memory 130 may store instructions or data associated with at least one other component(s) of the electronic device 100. According to an embodiment of the present disclosure, the memory 130 may store software, an application program which performs a content providing method according to various embodiments of the present disclosure, a voice recognition application, a web browsing application and data for executing the above-mentioned software or applications. For example, the memory 130 may store a control command and/or a content request corresponding to a voice input or may store abstract information and/or detailed information of content corresponding to the content request.

The voice input module 140 may receive a voice input uttered from a user. It may be understood that the voice input module 140 includes a physical microphone and additionally, a circuitry (e.g., analog-digital converter (ADC)) which performs a signal processing about the received voice input.

The audio output module 150 may include a speaker, a headphone, an earphone, a corresponding driver, an audio output interface, and the like. Abstract information or detailed information of content may be outputted as a sound through the audio output module 150 so as to be acoustically provided to a user.

For example, the video output module 160 may correspond to a display. The display may include, for example, a liquid crystal display (LCD), a light-emitting diode (LED) display, an organic LED (OLED) display, a microelectromechanical systems (MEMS) display, or an electronic paper display. Abstract information or detailed information of content may be outputted as a screen through the video output module 160 so as to be visually provided to a user.

The video output module 160 may display, for example, various contents (e.g., a text, an image, a video, an icon, a symbol, and the like) to a user. The video output module 160 may include a touch screen and may receive, for example, a touch, gesture, proximity, or hovering input using an electronic pen or a portion of a user's body.

For example, the camera 170 may shoot a still image and a video. According to an embodiment of the present disclosure, at least one of the camera 170 may include one or more image sensors, lenses, an image processing module, and the like. Furthermore, the electronic device 100 may include one or more cameras 170. The camera 170 may shoot a video of the vicinity of the electronic device 100 and at least a portion (e.g., face) of a user's body existing in the vicinity of the electronic device 100.

According to an embodiment, the camera 170 (in conjunction with the processor 120) may determine whether a user of the electronic device 100 is detected. For example, a method for tracking a user's pupil (so-called, eye tracking) may be used in determining a user's gaze.

Figure 2:
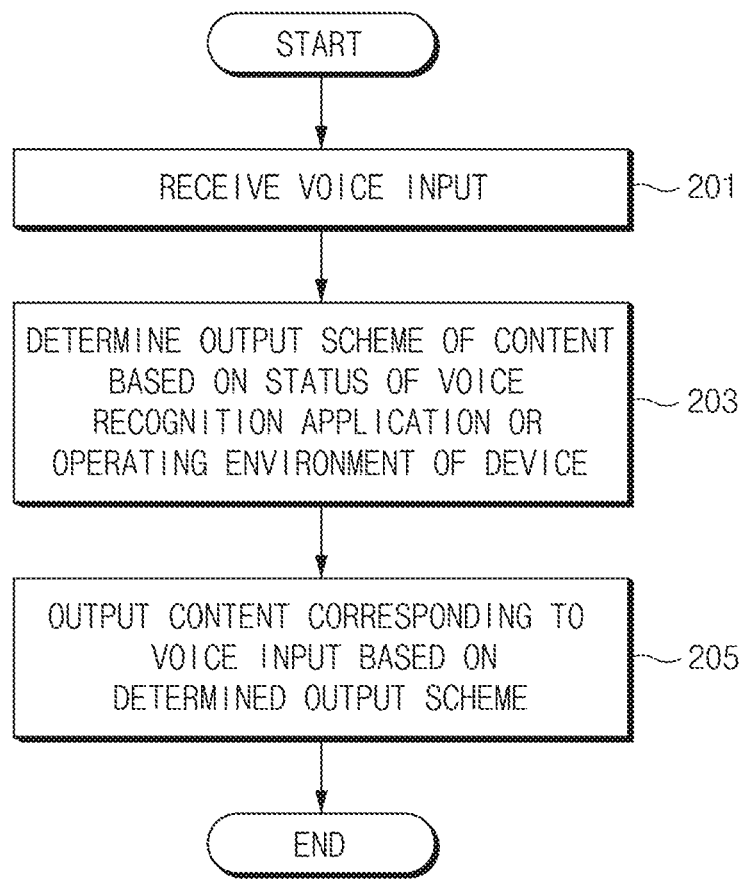
FIG. 2 is a flow chart illustrating a method for providing content according to an embodiment of the present disclosure.

FIG. 2 is a flow chart illustrating a method for providing content according to an embodiment of the present disclosure.

Referring to FIG. 2, in operation 201, the voice input module 140 may receive a voice input from a user through a voice recognition application. The received voice input may be provided to the processor 120 which executes the voice recognition application.

In operation 203, the processor 120 may determine content to be outputted based on the voice input and may determine an output scheme of the content based on a status of the voice recognition application or an operating environment of the electronic device 100. The content to be outputted may be set in advance by the voice recognition application in response to the voice input.

In operation 205, the processor 120 may output the content corresponding to the voice input based on the output scheme determined in operation 203 using at least one of the audio output module 150 or the video output module 160.

Figure 3:
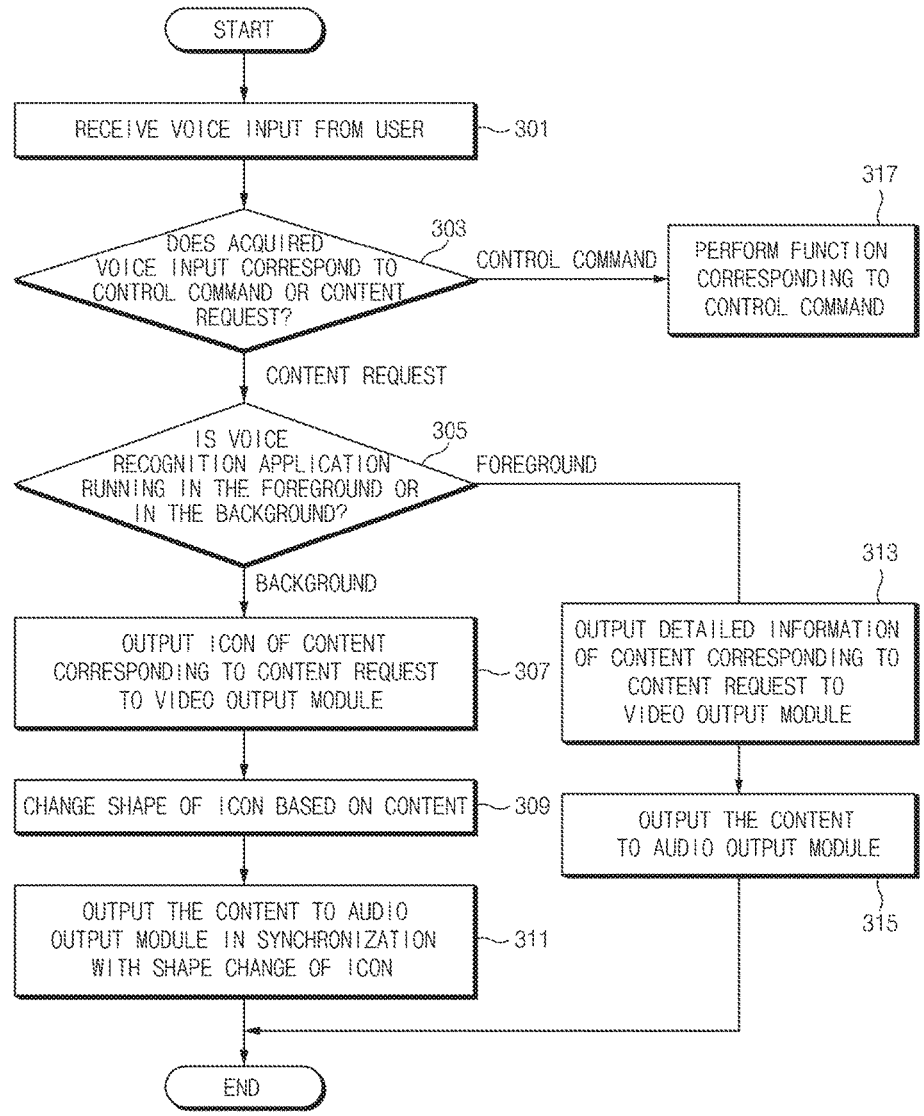
FIG. 3 is a flow chart illustrating a method for providing content based on a status of a voice recognition application according to an embodiment of the present disclosure.

FIG. 3 is a flow chart illustrating a method for providing content based on a status of a voice recognition application according to an embodiment of the present disclosure.

Referring to FIG. 3, a content providing method based on a status of a voice recognition application according to an embodiment of the present disclosure may include operation 301 to operation 317.

In operation 301, the voice input module 140 may receive a voice input from a user. For example, the voice input may be a simple word, such as "weather", "schedule", "Bluetooth", "wireless fidelity (Wi-Fi)", and the like, or may be a sentence, such as "Let me know today's weather.", "Let me know today's schedule.", "Read today's news.", "Turn on Bluetooth.", "Turn on Wi-Fi.", and the like. Furthermore, the voice input may be a control command (e.g., "Turn on Bluetooth.") to control a specific module embedded in the electronic device 100 or may be a content request (e.g., "Let me know today's weather.") which requests specific content.

In operation 303, the processor 120 may determine whether the received voice input is the control command about the module embedded in the electronic device 100 or is the content request which requests an output of the specific content. If the voice input corresponds to the content request, the procedure proceeds to operation 305. If the voice input corresponds to the control command, the procedure proceeds to operation 317. For example, if the voice input corresponds to a "weather", the procedure proceeds to operation 305. If the voice input corresponds to "Turn on Bluetooth.", the procedure proceeds to operation 317.

In operation 305, the processor 120 may determine a status of the voice recognition application and may determine whether the voice recognition application is running in the background or in the foreground. If the voice recognition application is running in the background, the procedure proceeds to operation 307. If the voice recognition application is running in the foreground, the procedure proceeds to operation 313.

FIG. 4A illustrates an electronic device in which a voice recognition application is running in a background according to an embodiment of the present disclosure.

Referring to FIG. 4A, a web browsing application may be running in the foreground in the electronic device 100. A screen 400a of the web browsing application may be displayed on the video output module 160 of the electronic device 100. If the voice recognition application is running in the background, a screen of the voice recognition application may not be displayed. However, since the voice recognition application is running in the background, the electronic device 100 may receive the voice input from the user through the voice input module 140. According to an embodiment of the present disclosure, before providing the voice input (e.g., "weather") to the electronic device 100, the user may provide a voice (e.g., "Hi, Galaxy."), which is specified in advance, such that a state of the voice recognition application is switched from a sleep state to an active state.

Figure 4B:
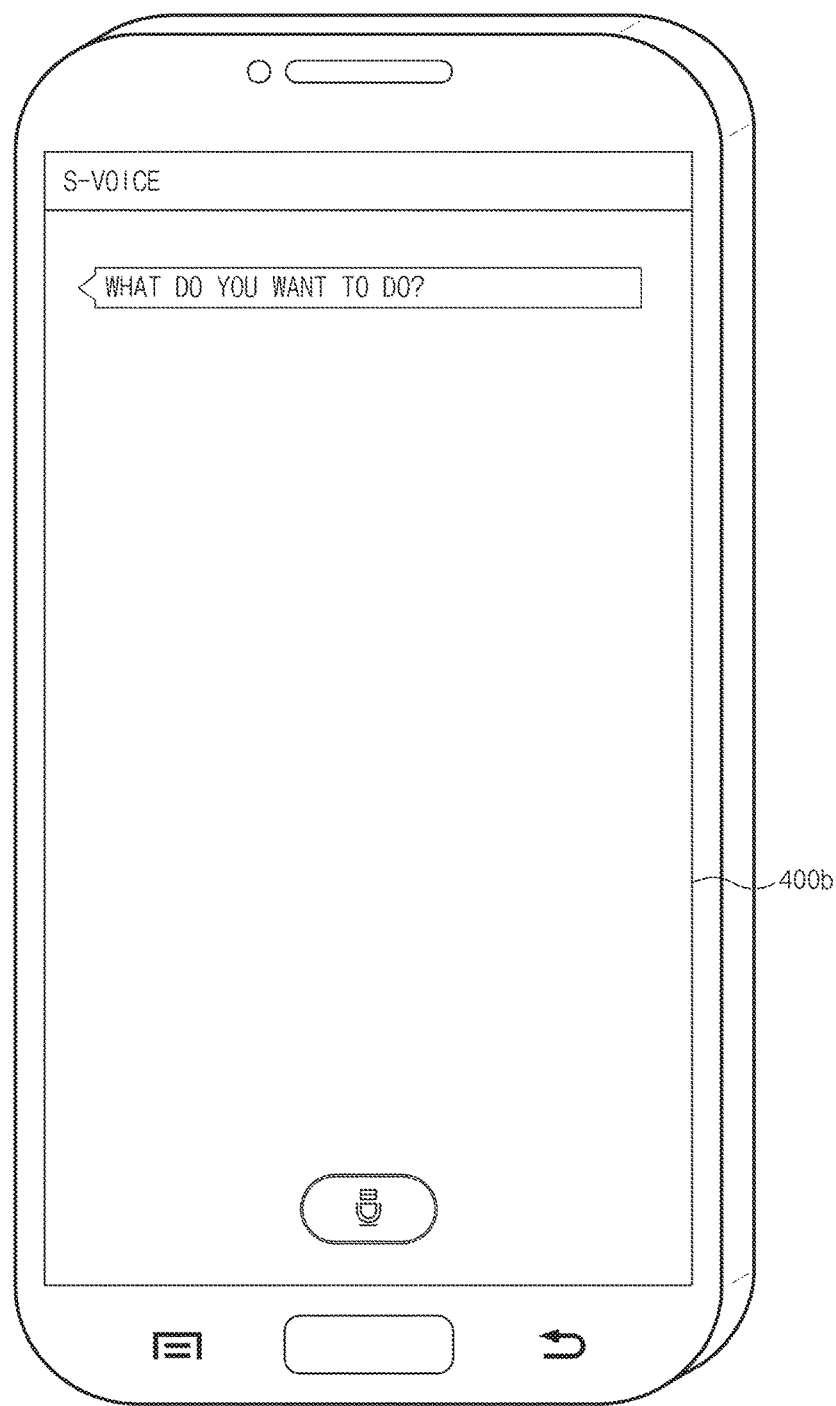
FIG. 4B is a diagram illustrating an electronic device in which a voice recognition application is running in a foreground according to an embodiment of the present disclosure.

FIG. 4B illustrates an electronic device in which a voice recognition application is running in a foreground according to an embodiment of the present disclosure.

Referring to FIG. 4B, the voice recognition application may be running in the foreground in the electronic device 100. A screen 400b of the voice recognition application may be displayed on the video output module 160 of the electronic device 100. According to an embodiment of the present disclosure, before providing the voice input to the electronic device 100, the user may provide a voice which is specified in advance or may select (touch) an object, which has a shape of a microphone illustrated in the bottom of the screen 400b, such that a state of the voice recognition application is switched from a sleep state to an active state.

In operation 307, the processor 120 may determine to control the video output module 160 to output an icon associated with content corresponding to the voice input (content request).

Figure 5A:
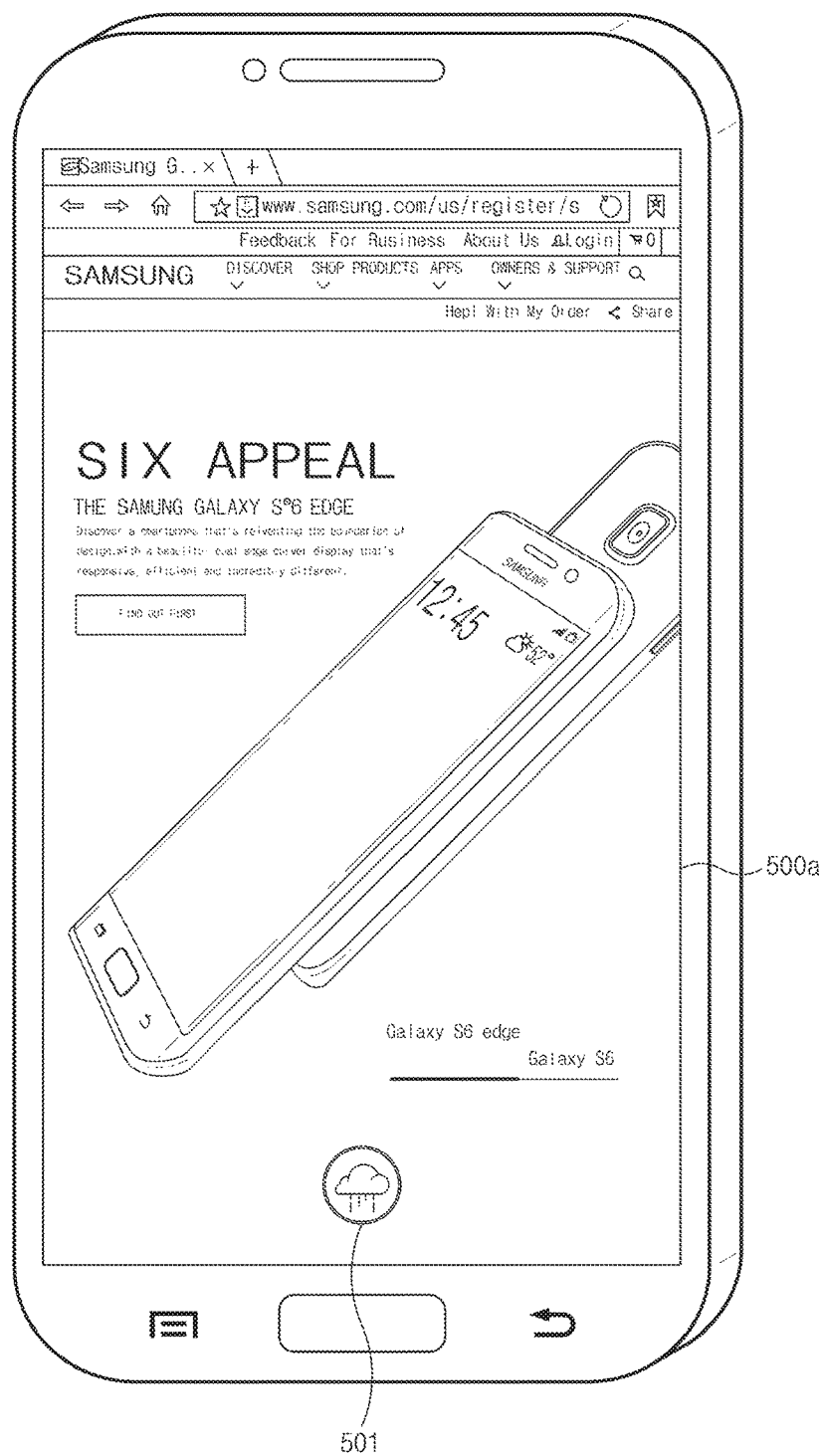
FIG. 5A illustrates an electronic device in which an icon is outputted when a voice recognition application is running in a background according to an embodiment of the present disclosure.

FIG. 5A illustrates an icon which is to be outputted when a voice recognition application is running in a background in an electronic device according to an embodiment of the present disclosure.

Referring to FIG. 5A, a screen 500a of the electronic device 100 may be displayed following the screen 400a of FIG. 4A. For example, if the voice input corresponding to the "weather" is received from the user, the processor 120 of the electronic device 100 may display a first icon 501 associated with the weather (e.g., cloudy and rain) of the day, on which the voice input is received, on the screen 500a on which the web browsing application is displayed. According to an embodiment of the present disclosure, a dynamic animation effect may be added to the first icon 501. For example, the animation effect, such as rain from the cloud, may be applied to the first icon 501.

According to an embodiment of the present disclosure, the processor 120 may determine to control the video output module 160 to output detailed information of content related to the first icon 501 in response to the selection (e.g., touch) about the first icon 501. For example, if the user touched the first icon 501, the video output module 160 may be switched from the screen 500a of FIG. 5A to a screen of the voice recognition application and may output detailed information of weather content on the screen (e.g., a screen 600 of FIG. 6) of the voice recognition application.

In operation 309, the processor 120 may determine to change a shape of the icon displayed in operation 307 based on the corresponding content.

Figure 5B:
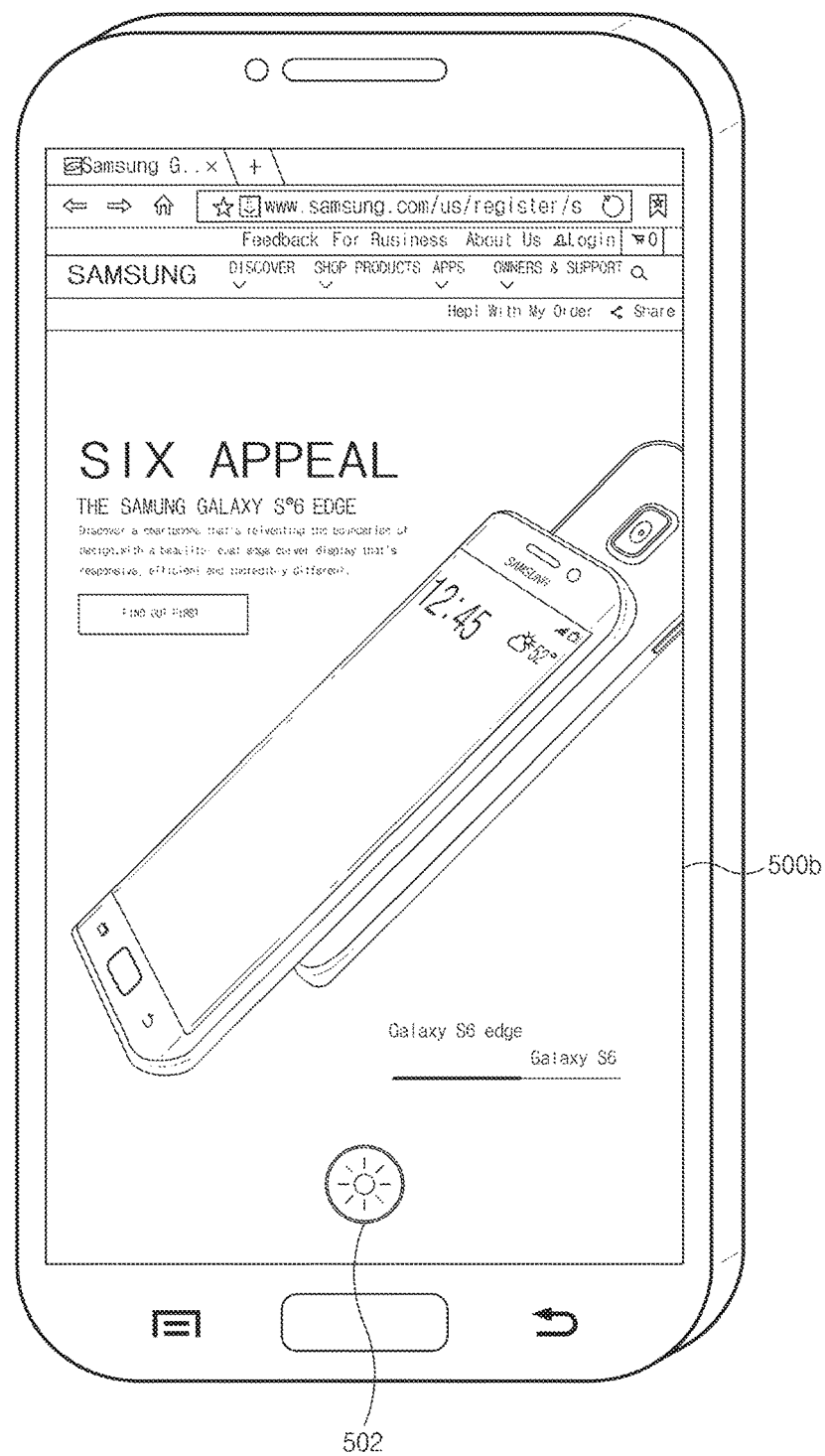
FIG. 5B illustrates an electronic device in which a shape of an icon is changed according to an embodiment of the present disclosure.

FIG. 5B illustrates that a first icon of FIG. 5A is changed to a second icon based on corresponding content according to an embodiment of the present disclosure.

Referring to FIG. 5B, for example, if a voice input corresponding to the "weather" is received from the user, the processor 120 of the electronic device 100 may change the first icon 501 of FIG. 5A to the second icon 502 of FIG. 5B such that the weather (e.g., clear up in the afternoon after cloudy and rain) of the day on which the voice input is received is symbolically displayed. Furthermore, according to an embodiment, the animation effect may be added in changing the first icon 501 of FIG. 5A to a second icon 502 of FIG. 5B. With this kind of the animation effect, the electronic device 100 may more effectively provide corresponding weather content to the user.

In operation 311, the processor 120 may output corresponding content through the audio output module 150 in synchronization with the shape change of the icon in operation 309. For example, in synchronization with the change from the first icon 501 of FIG. 5A to the second icon 502 of FIG. 5B, the processor 120 may determine to control the audio output module 150 to output weather content, such as "Today, rain in the morning and sunny in the afternoon". For example, when an audio corresponding to "Today, rain in the morning." is outputted, the first icon 501 may be outputted. However, when an audio corresponding to "Sunny in the afternoon." is outputted, the first icon 501 may be changed to the second icon 502.

In operation 313, if the voice recognition application is running in the foreground, the processor 120 may determine to control the video output module 160 to output detailed information of content corresponding to the voice input (content request).

Figure 6:
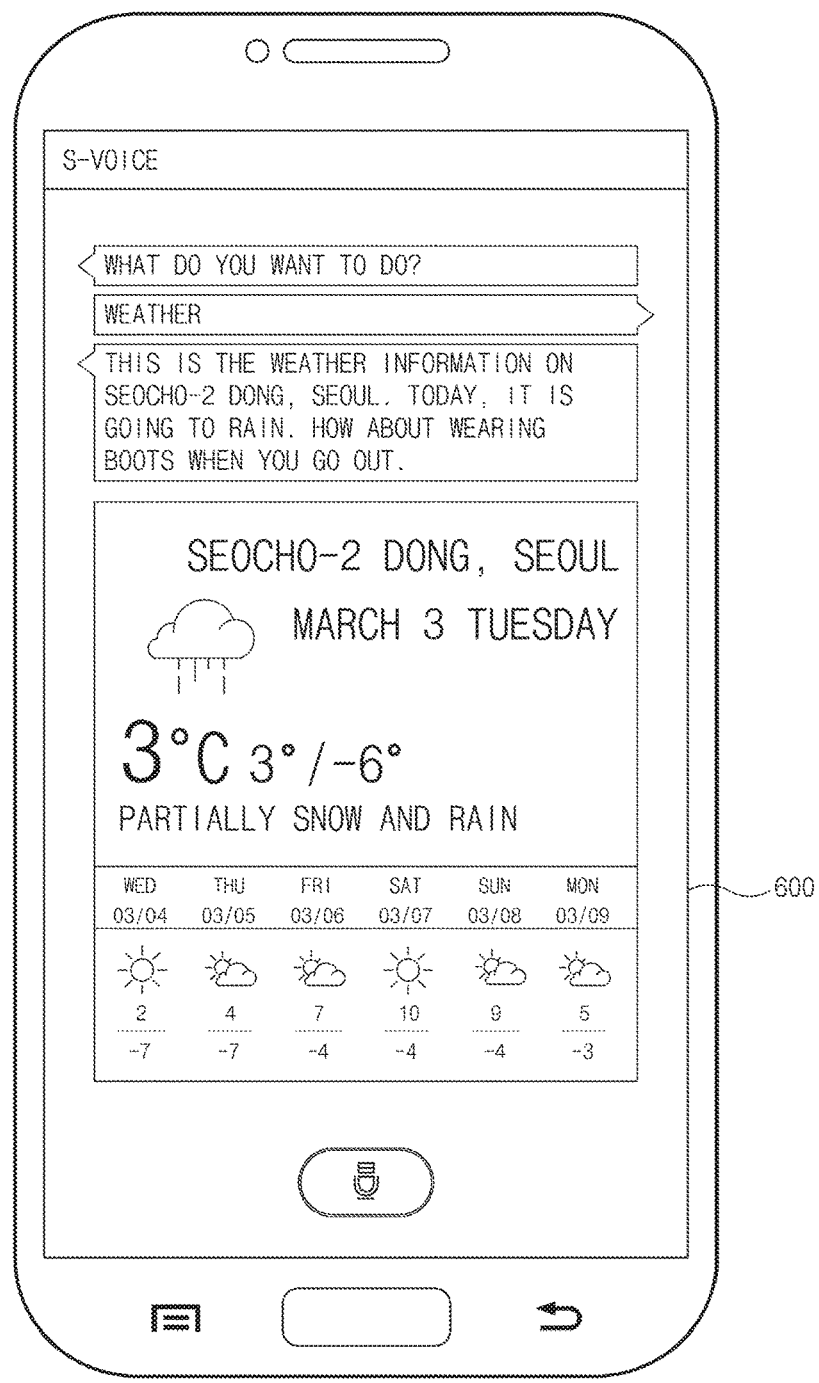
FIG. 6 illustrates an electronic device in which detailed information of content is displayed according to an embodiment of the present disclosure.

FIG. 6 illustrates a case in which a voice input from a user corresponds to a word "weather" according to an embodiment of the present disclosure.

Referring to FIG. 6, a screen 600 may be displayed after displaying of the screen 400b of FIG. 4B in response to the voice input from the user. For example, the processor 120 of the electronic device 100 may output detailed information (detailed information of weather content) of a weather of an area, on which the electronic device 100 is located, through the video output module 160 in response to the voice input of the "weather". As illustrated in FIG. 6, the detailed information of the weather may include weather information, dress suggestion according to the weather, a weekly weather, and the like.

In operation 315, the processor 120 may determine to control the audio output module 150 to output content corresponding to the content request. For example, FIG. 6 illustrates that the processor 120 outputs content, such as "This is the weather information on Seocho-2 Dong, Seoul. Today, it is going to rain. How about wearing boots when you go out.", through the audio output module 150 based on TTS.

Since operation 317 corresponds to the case where the received voice input corresponds to the control command, the processor 120 may perform a function corresponding to the control command. For example, in the case where the voice input corresponds to "Bluetooth" or "Turn on Bluetooth.", the processor 120 may perform control to activate the Bluetooth module.

According to an embodiment of the present disclosure, the processor 120 may perform a function corresponding to the control command and may simultaneously display an icon associated with the function corresponding to the control command on the screen of the video output module 160. For example, if the voice input module 140 receives the voice input corresponding to "Turn on Bluetooth." while the web browsing application is running in the foreground as shown in FIG. 5A, the processor 120 may activate the Bluetooth module, and at the same time, may display an icon associated with Bluetooth instead of the first icon 501 of FIG. 5A on the screen 500a of the video output module 160.

According to various embodiments of the present disclosure, the output scheme (e.g., icon display or detailed information provision) of the video output module 160 may be automatically determined based on an execution status of the voice recognition application. As such, the electronic device 100 may effectively provide content according to the voice recognition without interrupting the situation (e.g., output situation of the video output module 160) in which the user currently uses the electronic device 100.

Furthermore, according to an embodiment of the present disclosure, in the case where the voice recognition application is running in the background, only an icon which does not interfere with a different application may be displayed on the video output module 160 in response to the voice input. That is, since the voice recognition application is not running in the foreground even though the voice input is received, the user may more effectively use an application.

Figure 7:
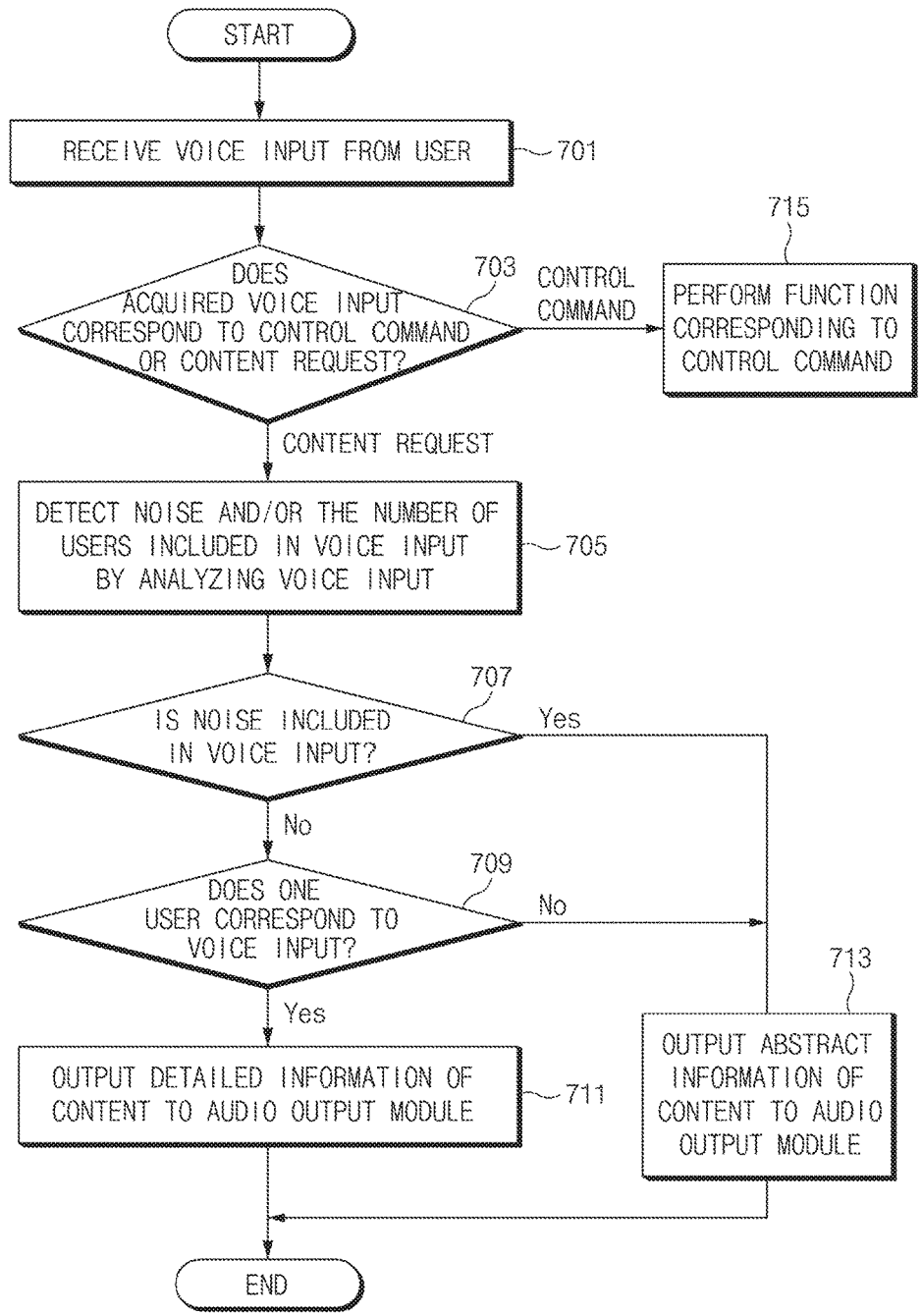
FIG. 7 is a flow chart illustrating a method for providing content based on an analysis of a voice input according to an embodiment of the present disclosure.

FIG. 7 is a flow chart illustrating a method for providing content based on an analysis of a voice input according to an embodiment of the present disclosure.

Referring to FIG. 7, a content providing method based on an analysis of a voice input according to an embodiment of the present disclosure may include operation 701 to operation 715. Since operation 701, operation 703, and operation 715 of FIG. 7 correspond to operation 301, operation 303, and operation 317 of FIG. 3, respectively, the duplicated descriptions will be omitted. However, a voice input received in operation 701 may correspond to "Let me know today's schedule".

In operation 705, the processor 120 may analyze the voice input and may detect a noise included in the voice input and the number of users corresponding to the voice input. The detection result may be used to determine an output scheme of content.

In operation 707, the processor 120 may determine whether a noise which satisfies a specified condition is included in the voice input. For example, the processor 120 may determine whether a noise which generally occurs in the outside is included in the voice input. For example, a fine noise which is generated in the quiet inside or a noise according to an internal operation of the electronic device 100 may not be considered in determining whether the noise satisfies the specified condition in operation 707. If the noise which satisfies the specified condition is included in the voice input, the procedure proceeds to operation 713. Otherwise, the procedure proceeds to operation 709.

In operation 709, the processor 120 may determine the number of users corresponding to the voice input. For example, the processor 120 may determine the number of users corresponding to the voice input through an analysis of frequency or wave shape. If the number of users corresponding to the voice input is a user, the procedure proceeds to operation 711. If the number of users corresponding to the voice input is a plurality of users, the procedure proceeds to operation 713.

In operation 711, in the case where the noise which satisfies the specified condition is not included in the voice input, and a user corresponding to the voice input is detected in the voice input, the processor 120 may output detailed information of content through the audio output module 150. For example, when the user is alone indoors without a surrounding noise, the user may be acoustically provided with detailed information of schedule content, such as "Today, there is a team meeting at 9:30 AM and a date at 8 PM." in response to the voice input, such as "Let me know today's schedule".

In operation 713, in the case where the noise which satisfies the specified condition is included in the voice input, and a plurality of users corresponding to the voice input is detected in the voice input, the processor 120 may output abstract information of content through the audio output module 150. For example, the user who is talking with other users or is in the noisy outside may be acoustically provided with abstract information of schedule content, such as "Today, there are two schedules.", in response to the voice input, such as "Let me know today's schedule".

According to various embodiments of the present disclosure, the electronic device 100 may analyze the voice input and may grasp the operating environment of the electronic device 100. The electronic device 100 may determine an output scheme of content based on the grasped operating environment. Furthermore, since the output scheme of content is differently set by distinguishing between the case where one user is present indoors and the case where a plurality of users is present, the content, such as detailed information of "schedule", which causes a difficult situation if the content is known to the outside may not be outputted through the audio output module 150.

Figure 8:
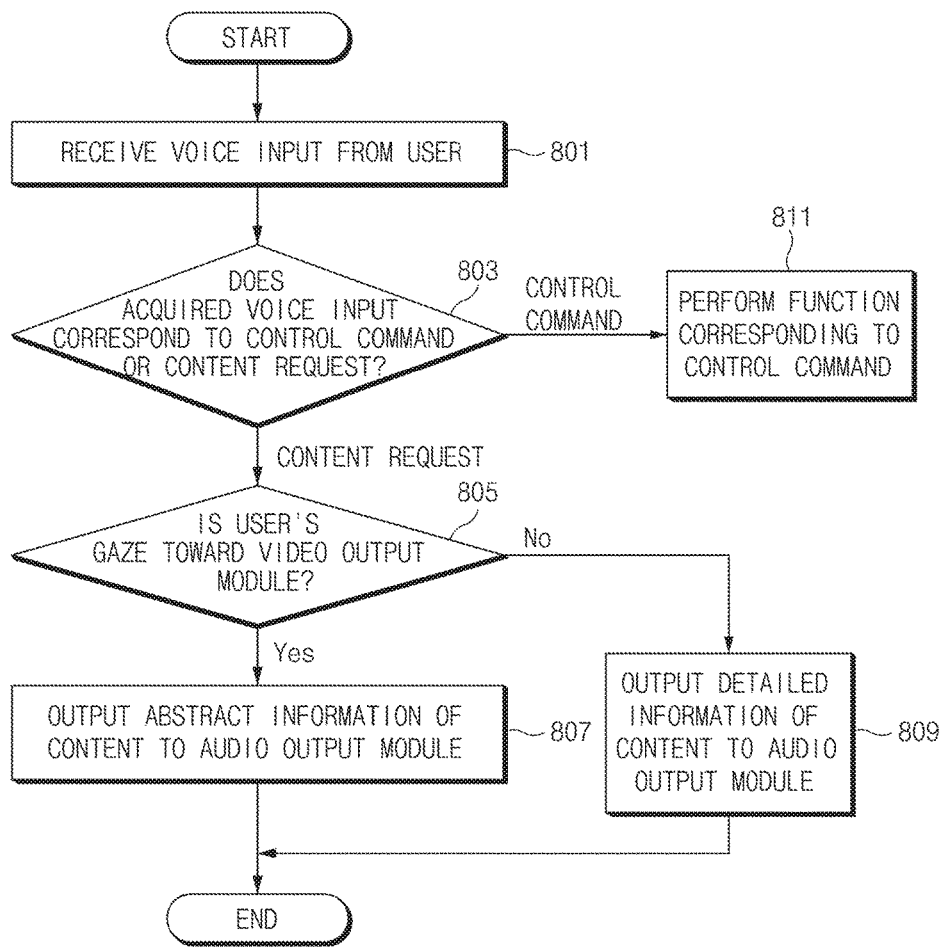
FIG. 8 is a flow chart illustrating a method for providing content based on determination of a user's gaze according to an embodiment of the present disclosure.

FIG. 8 is a flow chart illustrating a method for providing content based on determination of a user's gaze according to an embodiment of the present disclosure.

Referring to FIG. 8, according to an embodiment of the present disclosure, a content providing method based on determination of a user's gaze may include operation 801 to operation 811. Since operation 801, operation 803, and operation 811 correspond to operation 301, operation 303, and operation 317 of FIG. 3, respectively, the duplicated descriptions will be omitted. However, in operation 801, a received voice input may correspond to "Read today's news".

In operation 805, the processor 120 may determine whether a gaze of the user of the electronic device 100 is toward the video output module 160. The processor 120 may determine an output scheme of content (e.g., headline news article) to be outputted through the audio output module 150 and/or the video output module 160 based on a result of determining the user's gaze. If it is determined that the user's gaze is toward the video output module 160, the procedure proceeds to operation 807. If it is determined that the user's gaze is not toward the video output module 160, the procedure proceeds to operation 809.

In operation 807, the processor 120 may determine to control the audio output module 150 to output abstract information of content. For example, the user may be acoustically provided with only a title of the headline news article (abstract information of content) through the audio output module 150 in response to the voice input, such as "Read today's news".

In operation 809, the processor 120 may determine to control the audio output module 150 to output detailed information of the content. For example, the user may be acoustically provided with the title and content of the headline news article (detailed information of content) through the audio output module 150 in response to the voice input, such as "Read today's news".

According to various embodiments of the present disclosure, an output scheme of content may be determined based on whether the user's gaze is toward to the video output module 160, that is, an operating environment of the electronic device 100. For example, the user who is provided with the content through the video output module 160 may increase the capacity to concentrate in a content acquisition since the user does not need to be repeatedly provided with detailed information of the same content through the audio output module 150. Furthermore, when it is difficult for the user's gaze to be toward the video output module 160 of the electronic device 100, for example, when the user is in driving, the user may be acoustically provided with detailed information of content.

Figure 9:
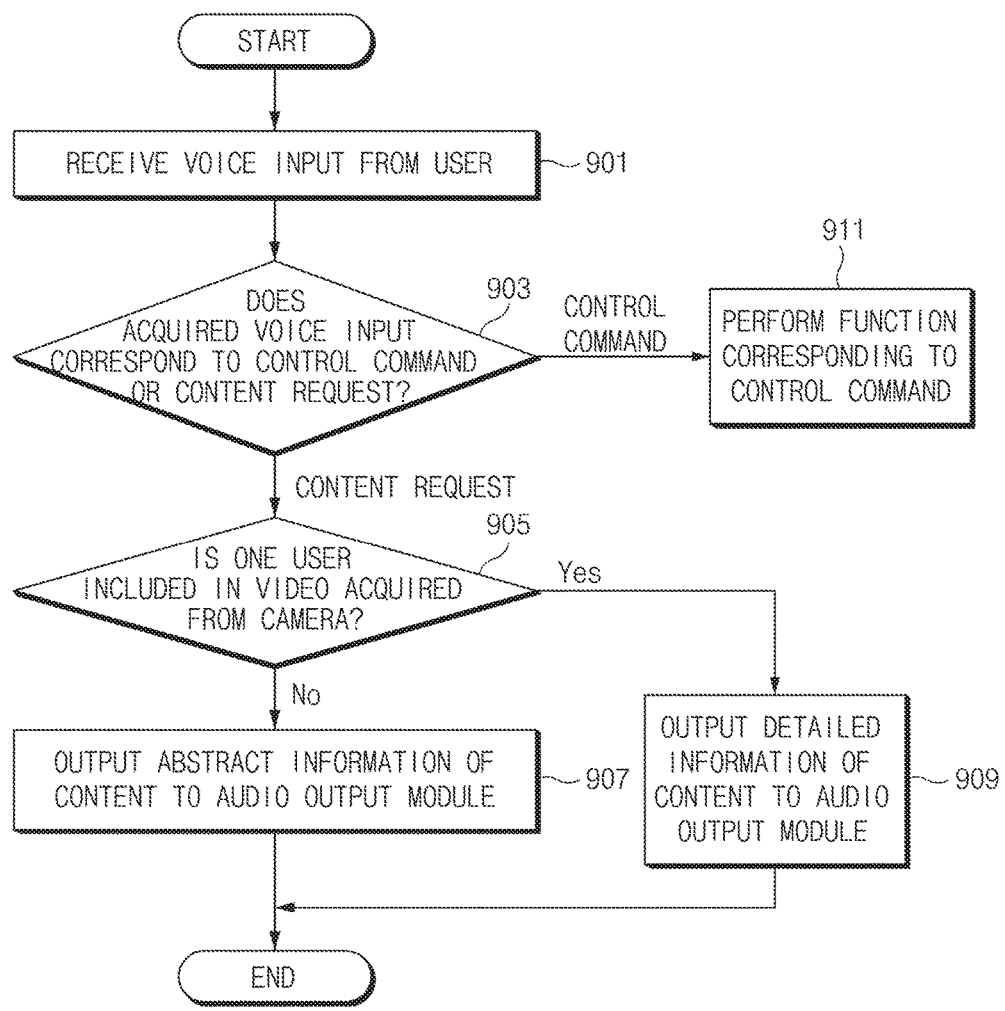
FIG. 9 is a flow chart illustrating a method for providing content based on a video processing according to an embodiment of the present disclosure.

FIG. 9 is a flow chart illustrating a method for providing content based on a video processing according to an embodiment of the present disclosure.

Referring to FIG. 9, a content providing method based on a video processing according to an embodiment of the present disclosure may include operation 901 to operation 911. Since operation 901, operation 903, and operation 911 of FIG. 9 correspond to operation 301, operation 303, and operation 317 of FIG. 3, respectively, the duplicated descriptions will be omitted. However, a voice input received in operation 901 may correspond to "Let me know today's schedule".

In operation 905, the processor 120 may determine whether a user is included in the video obtained from the camera 170 or whether a plurality of users is included in the video obtained from the camera 170. For example, the processor 120 may determine how many users are included in the video shot by the camera 170. For example, the processor 120 may recognize a user's face through a face recognition algorithm and thus may determine the number of users based on the face recognition algorithm. If a user is included in the video, the procedure proceeds to operation 909. If a plurality of users is included in the video, the procedure proceeds to operation 907.

Furthermore, according to an embodiment, the processor 120 may recognize a specific user through the face recognition algorithm. For example, the processor 120 may determine whether there is an authenticated user of the electronic device 100 in the video shot by the camera 170. If a user included in the video is the authenticated user, the procedure proceeds to operation 909. If a user included in the video is not the authenticated user, the procedure proceeds to operation 907.

In operation 907, the processor 120 may determine to control the audio output module 150 to output abstract information of content. If a plurality of users (i.e., two or more) is included in the video shot by and received from the camera 170, the processor 120 may output abstract information of content through the audio output module 150.

Alternatively and additionally, the processor 120 may output an icon associated with content through the video output module 160.

For example, in the case where there is a plurality of users in a vicinity of the electronic device 100, the user of the electronic device 100 may be acoustically provided with abstract information of schedule content, such as "Today, there are two schedules.", in response to the voice input, such as "Let me know today's schedule". Furthermore, the user of the electronic device 100 may be acoustically provided with abstract information of the schedule content and may be visually provided with an icon (e.g., a calendar icon associated with the schedule content) associated with the content through the video output module 160 at the same time.

Furthermore, according to an embodiment, if a user (authenticated user) of the electronic device 100 is not included in the video received from the camera 170, the processor 120 may output abstract information of content through the audio output module 150. Alternatively, if the authenticated user of the electronic device 100 is not included in the received video, the processor 120 may not even output abstract information of content.

In operation 909, the processor 120 may determine to control the audio output module 150 to output detailed information of content. If a user is included in the video shot by and received from the camera 170, the processor 120 may output detailed information of content through the audio output module 150. Alternatively and additionally, the processor 120 may output detailed information of content through the video output module 160.

For example, when only a user is present in the vicinity of the electronic device 100, the user may be acoustically provided with detailed information of schedule content, such as "Today, there is a team meeting at 9:30 AM and a date at 8 PM." in response to the voice input, such as "Let me know today's schedule". Furthermore, the user of the electronic device 100 may be acoustically provided with detailed information of the schedule content and may be visually provided with a screen, on which the detailed information of the content is displayed, through the video output module 160 at the same time.

Furthermore, according to an embodiment of the present disclosure, if a true user (authenticated user) of the electronic device 100 is included in the video shot by and received from the camera 170, the processor 120 may output detailed information of content through the audio output module 150. Alternatively, if the true user of the electronic device 100 is included in the received video, the processor 120 may output abstract information of content.

According to various embodiments of the present disclosure, the electronic device 100 may grasp an operating environment of the electronic device 100 by analyzing a video obtained from the camera 170. The electronic device 100 may determine an output scheme of content based on the grasped operating environment. Furthermore, since the output scheme of content is set differently according to the case where a user is present and the case where a plurality of users is present, the content, such as detailed information of "schedule", which causes a difficult situation if the content is known to the outside may not be outputted through the audio output module 150.

Furthermore, in an embodiment in which a specific user is recognized, the electronic device 100 may authenticate whether a user present in the vicinity of the electronic device 100 is the true user using the face recognition algorithm. Accordingly, the true user of the electronic device 100 may be provided with content, which causes a difficult situation if the content is known to the outside, with higher security.

Meanwhile, content providing methods described in FIGS. 3, 7, 8, and 9 are examples and may not be limited to a description given with reference to accompanying drawings. Furthermore, at least two or more of the content providing methods described in FIGS. 3, 7, 8, and 9 may be combined.

For example, when an e-book application is running in the foreground in the electronic device 100, a user who is in the noisy outside may perform an voice input, such as "Hi, Galaxy." and "Let me know today's schedule." with respect to the electronic device 100. In this case, the electronic device 100 may display an icon (e.g., an icon of calendar shape) associated with "schedule" on a screen of the e-book application. Furthermore, the electronic device 100 may provide abstract information of content, such as "There is one schedule, today.", through the audio output module 150 together with the display of the icon, based on TTS.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments of the present disclosure may be, for example, implemented by instructions stored in a computer-readable storage media in the form of a program module. The instruction, when executed by one or more processors (e.g., a processor 120), may cause the one or more processors to perform a function corresponding to the instruction. The computer-readable storage media, for example, may be the memory 130.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a ROM, a random access memory (RAM), or a flash memory). Also, a program instruction may include not only a mechanical code such as things generated by a compiler but also a high-level language code executable on a computer using an interpreter. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included therein. Operations executed by modules, program modules, or other elements may be executed by a successive method, a parallel method, a repeated method, or a heuristic method. Also, a portion of operations may be executed in different sequences, omitted, or other operations may be added.

According to an embodiment of the present disclosure, the electronic device may grasp a status of a voice recognition application or an operating environment of the electronic device and may determine an output scheme of content based on the grasped operating environment. With this method, the content may be provided in the output scheme which is the most suitable to a situation in which a user utilizes an electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a voice input module configured to receive a voice input;
    an audio output module;
    a display;
    a memory configured to store a voice recognition application which provides content in response to the voice input; and
    a processor configured to:
        execute the voice recognition application, and
        determine an output scheme of the content to be outputted through the display based on whether the voice recognition application is running in a foreground or in a background.

2. The electronic device of claim 1, wherein, the processor is further configured to:
    control the display, if the voice recognition application is running in the foreground, to output detailed information of the content, and
    control the display, if the voice recognition application is running in the background, to output an icon associated with the content.

3. The electronic device of claim 2, wherein the processor is further configured to change a shape of the icon based on the content.

4. The electronic device of claim 3, wherein the processor is further configured to synchronize an output of the content by the audio output module and a shape change of the icon.

5. The electronic device of claim 2, wherein the processor is further configured to control the display to output the detailed information of the content in response to a selection of the icon.

6. The electronic device of claim 1, wherein the processor is further configured to:
    analyze the voice input,
    detect a noise included in the voice input or the number of users corresponding to the voice input, and
    determine an output scheme of content to be outputted through the audio output module based on the detection result.

7. The electronic device of claim 6, wherein if a noise which satisfies a specified condition is detected in the voice input, the processor is further configured to control the audio output module to output abstract information of the content.

8. The electronic device of claim 6, wherein if a noise which satisfies a specified condition is not detected in the voice input, the processor is further configured to control the audio output module to output detailed information of the content.

9. The electronic device of claim 6, wherein if a plurality of users corresponding to the voice input is detected in the voice input, the processor is further configured to control the audio output module to output abstract information of the content.

10. The electronic device of claim 6, wherein if a user corresponding to the voice input is detected in the voice input, the processor is further configured to control the audio output module to output detailed information of the content.

11. The electronic device of claim 1, further comprising:
    a camera configured to detect a gaze of a user of the electronic device,
    wherein the processor is further configured to determine the output scheme of the content to be outputted through the audio output module based on a result of determining the gaze.

12. The electronic device of claim 11, wherein, if it is determined that the user's gaze is toward the display, the processor is further configured to control the audio output module to output abstract information of the content.

13. The electronic device of claim 11, wherein, if it is determined that the user's gaze is not toward the display, the processor is further configured to control the audio output module to output detailed information of the content.

14. The electronic device of claim 1, further comprising:
    a camera configured to shoot a video of a vicinity of the electronic device,
    wherein the processor is further configured to determine the output scheme of the content to be outputted through the audio output module or the display based on the video of the vicinity of the electronic device.

15. A method for providing content in an electronic device, the method comprising:
    receiving a voice input through a voice recognition application;
    determining content to be outputted based on the voice input;
    determining an output scheme of the content based on whether the voice recognition application is running in a foreground or in a background; and
    outputting the content corresponding to the voice input on a display based on the determined output scheme.

16. The method of claim 15, wherein the determining of the output scheme of the content comprises:
    displaying on the display detailed information of the content, if the voice recognition application is running in the foreground, and
    displaying on the display an icon associated with the content, if the voice recognition application is running in the background.

17. The method of claim 16, wherein the displaying on the display of the icon comprises:
    changing a shape of the icon based on the content.

18. The method of claim 17, wherein the determining of the output scheme of the content further comprises:
    outputting by the audio output module the content in synchronization with a shape change of the icon.

19. The method of claim 15, further comprising:
    analyzing the received voice input; and
    detecting a noise included in the voice input or the number of users corresponding to the voice input based on the analyzed result,
    wherein the determining of the output scheme of the content comprise determining an output scheme of content to be outputted through the audio output module based on the detection result.

20. The method of claim 15, further comprising:
  determining a gaze of a user of the electronic device,
  wherein the determining of the output scheme of the content comprises determining an output scheme of content to be outputted through the audio output module based on the result of determining the gaze.

\* \* \* \* \*